United States Patent
Thelin

[11] 3,963,266
[45] June 15, 1976

[54] DUPLEX TRAILER HITCH

[76] Inventor: Mark O. Thelin, Lackawanna Drive, R.D. 2, Stanhope, N.J. 07874

[22] Filed: Sept. 9, 1975

[21] Appl. No.: 611,703

[52] U.S. Cl. ............................ 280/504; 280/511
[51] Int. Cl.² ............................................. B60D 1/06
[58] Field of Search ................ 280/511, 504, 514

[56] References Cited
UNITED STATES PATENTS

| 3,385,611 | 5/1968 | Silver | 280/504 |
| 3,837,674 | 9/1974 | Rathsack | 280/511 |
| 3,922,006 | 11/1975 | Borges | 280/511 |

*Primary Examiner*—Robert R. Song
*Attorney, Agent, or Firm*—Popper & Bobis

[57] ABSTRACT

A duplex trailer hitch which provides a hook and a pivotable closure to receive a lunette, and a ball on the end of the end of the hook to receive a coupler.

4 Claims, 4 Drawing Figures

DUPLEX TRAILER HITCH

BACKGROUND OF THE INVENTION

1. Field of Invention

This invention relates generally to pintle trailer hitches and specifically, to a combination pintle - ball trailer hitch.

2. Prior Art

For light traveling usually of a private nature, the ball-type hitch has been in use for many years. For heavy traveling, the ball-type hitch is not sufficiently strong. The pintle-type hitch was devised, and has strength sufficient for heavy commercial duty. The ball-type will accommodate a coupler attachment, but has nothing to hold a lunette. The pintle-type will accommodate a lunette, but will not accommodate the standard ball coupler. Change over of hitches was therefore required if different types of attachments were to be made on the same vehicle. The long felt need was met by a duplex mounting for both a pintle and a ball hitch. This device is however bulky, cumbersome and expensive. It is somewhat awkward to use. The need for a true double-purpose hitch which is simple, compact, durable, convenient, and inexpensive is met by the present device.

SUMMARY OF INVENTION

It has been found that a pintle and a ball trailer hitch can be provided which is suitable for both private and commercial towing. It is strong and durable. It is simple to construct and maintain. It is always available for both lunette and coupler without the need to demount the pintle and substitute the ball. This is accomplished by forming a ball on one end of the arcuate hook of the pintle where it is always ready for a coupler, and does not interfere with the seizure of a lunette.

DRAWINGS

These objects and advantages, as well as other objects and advantages are attained by the device shown by way of illustration in drawings in which FIG. 1 is a side elevational view of the pintle trailer hitch closed;

PREFERRED EMBODIMENT

Figure 1:
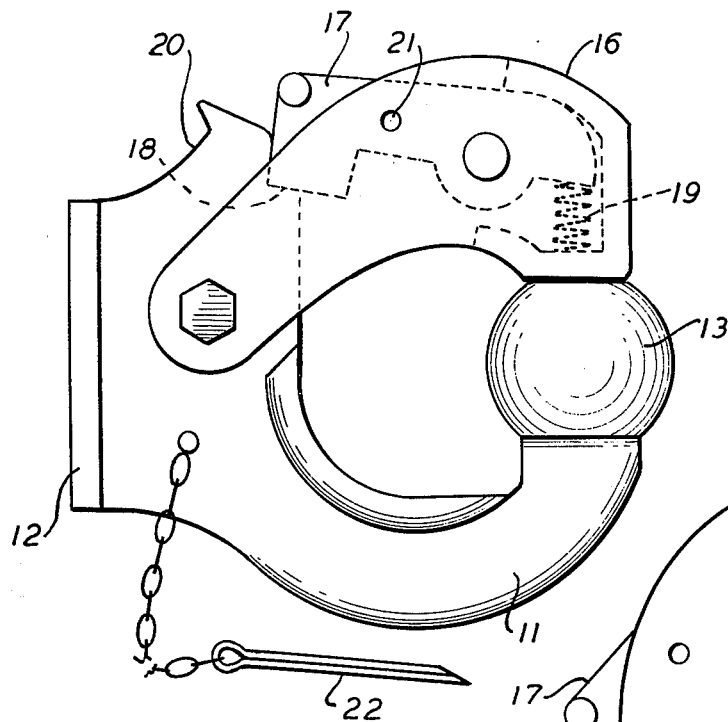

Referring now to the drawings in detail, the pintle trailer hitch provides a hook 11 which is generally arcuate. A mounting plate 12 is provided at one end to enable the hitch to be attached to a towing vehicle. At the other end of the hook 11, a ball 13 is mounted. The ball is dimensioned to receive a lunette 14 on the end of a towing bar 15.

A closure 16 complementary to the hook 11 is pivotably mounted on the other end of the hook. The closure 16 is movable away from the ball 13, and is generally arcuate, so that when it is engaged with the ball 13, it complements the hook 11 to form a closed circle, thereby to trap the lunette 14, to prevent the disengagement of a vehicle connected to the tow-bar 15.

The closure 16 is provided with a spring loaded latch 17, pivotably mounted on the closure 16. A seat 18 for the latch 17 is cut into the hook 11 to affirmatively position the closure 16 so that it is locked in engagement with the ball 13 as shown in FIGS. 1 and 3. A spring 19 engaged with the latch 17 accomplishes this. To raise the closure 16, the latch 17 is raised to overcome the spring 19, unseating the latch 17 from the seat 18. The latch 17 will then ride over the top of the hook 11 and enter the second seat 20, holding the closure 16 in the position shown in FIGS. 2 and 4. In that position, a lunette 14 may be positioned to embrace the ball 13, and then the closure is returned to lock position shown in FIGS. 1 and 2. A hole 21 in both the closure 16 and the latch 17 will permit the insertion of a cotter pin 22 to insure against accidental unlatching. Similarly, the cotter pin 22 may be applied with the closure 16 in raised position shown in FIGS. 2 and 3.

Figure 2:
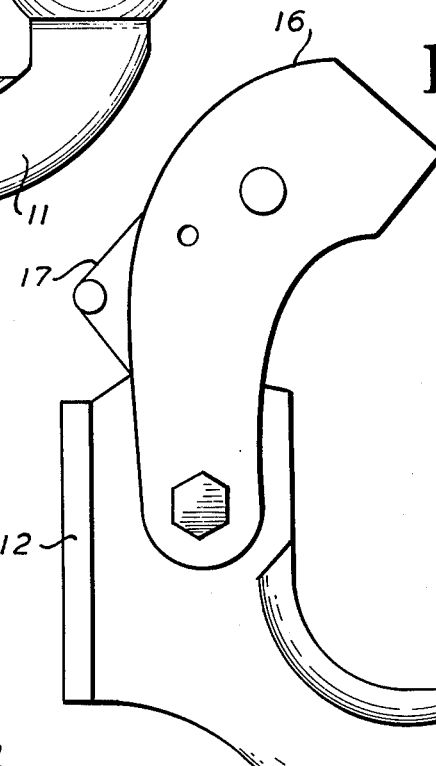
FIG. 2 is a side elevational view of the hitch open.
Figure 3:
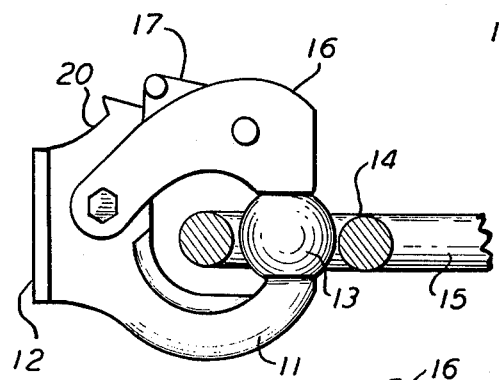
FIG. 3 is the same view, with a lunette engaged with the hitch.
Figure 4:
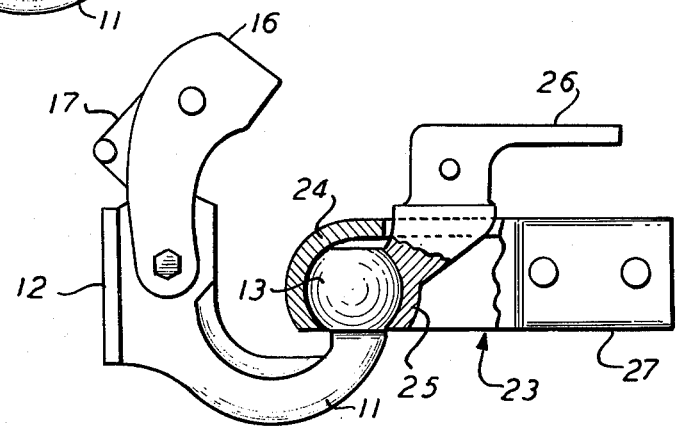
FIG. 4 is a side elevational view of the hitch open, engaged with a coupler.

When the closure 16 is raised as in FIGS. 2 and 3, the ball 13 is engagable with the standard coupler 23. This coupler 23 has a split sphere 24, 24, the parts of which are brought together by twisting the handle 26, which serves to capture the ball 13. The coupler 23 is secured to the end of a towing bar 27. This pintle trailer hitch is suitable for towing either light or heavy trailers, by the use of the lunette 14, or the coupler 23.

What is claimed is:

1. A duplex trailer hitch for attachment to a lunette or a coupler comprising
   a. a hook,
   b. a ball on one end of the hook,
   c. a closure pivotably mounted on the other end of the hook, and pivotable from a position spaced away from the ball, to engagement with the top of the ball,
   d. means to latch the closure alternately in open position, spaced away from the ball, and in engagement with the ball,
   e. the closure in closed position holding a lunette against release,
   f. the closure in open position permitting the introduction of a lunette over the ball, and also alternately permitting a coupler to seize the ball.

2. The device according to claim 1 and the means to latch comprising,
   a. a latch pivotably mounted on the hook,
   b. a pair of seats on the hook for engagement with the latch to hold the closure alternately in open or closed position with respect to the hook.

3. The device according to claim 2 and a spring normally urging the latch into seated engagement alternately with the seats.

4. The device according to claim 2 and a pin passed through the closure and the latch to hold the closure alternately in open or closed position.

* * * * *